Figure 1:
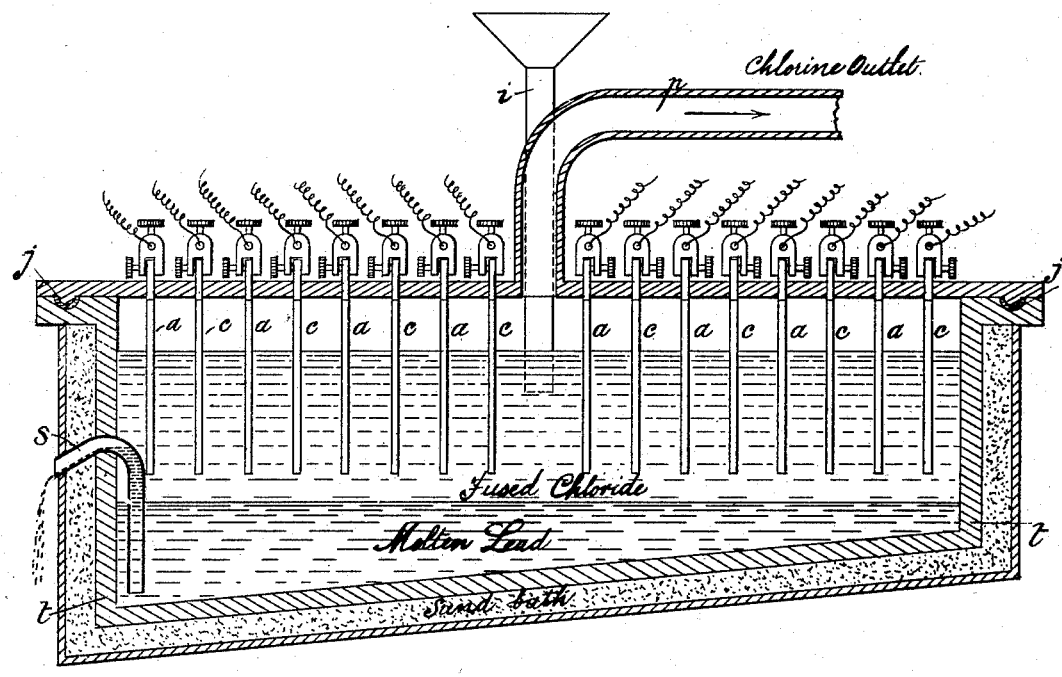

(No Model.)  
F. M. & C. H. M. LYTE.  
PROCESS OF PRODUCING CHLORINE AND PURIFYING LEAD.  
No. 503,429. Patented Aug. 15, 1893.

(No Model.)  2 Sheets—Sheet 2.
F. M. & C. H. M. LYTE.
PROCESS OF PRODUCING CHLORINE AND PURIFYING LEAD.
No. 503,429. Patented Aug. 15, 1893.
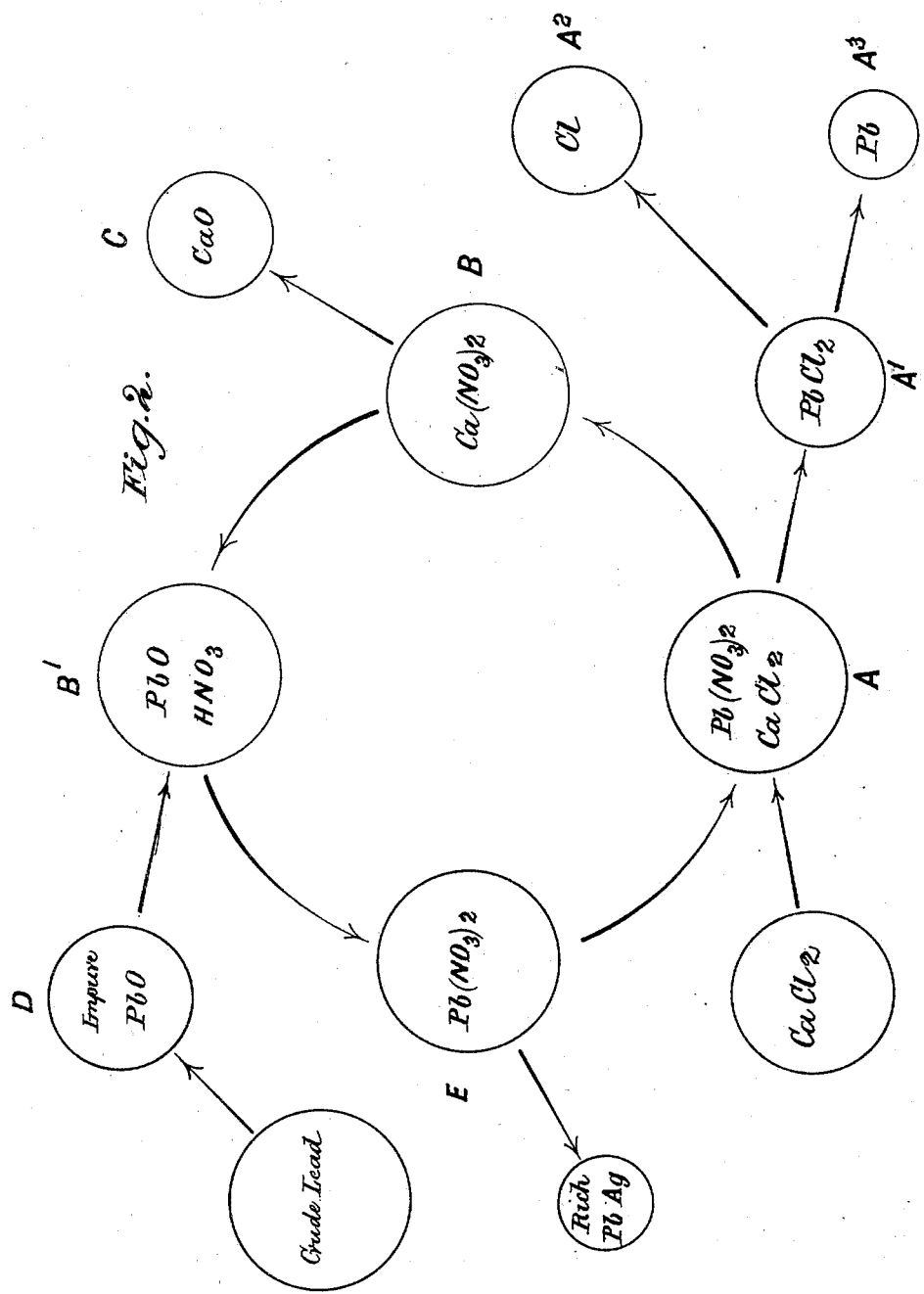
WITNESSES:
E. M. Clarke
C. Sedgwick
INVENTORS
F. M. Lyte
C. H. M. Lyte
BY Munn & Co.
ATTORNEYS.

UNITED STATES PATENT OFFICE.

FARNHAM MAXWELL LYTE AND CECIL HENRY MAXWELL LYTE, OF LONDON, ENGLAND.

PROCESS OF PRODUCING CHLORINE AND PURIFYING LEAD.

SPECIFICATION forming part of Letters Patent No. 503,429, dated August 15, 1893.

Application filed April 10, 1893. Serial No. 469,801. (No specimens.) Patented in England October 16, 1891, No. 17,745; in France August 19, 1892, No. 233,880, and in Belgium August 20, 1892, No. 101,017.

*To all whom it may concern:*

Be it known that we, FARNHAM MAXWELL LYTE, analytical chemist, and CECIL HENRY MAXWELL LYTE, esquire, both of 60 Finborough Road, London, England, have invented new and useful Improvements in the Production of Chlorine Conjointly with the Purification of Lead and the Recovery of Silver, (for which we have obtained Letters Patent in the following countries, namely: Great Britain, dated October 16, 1891, No. 17,745; France, dated August 19, 1892, No. 233,880, and Belgium, dated August 20, 1892, No. 101,017,) of which the following is a full, clear, and exact description.

Our invention relates to the production of chlorine conjointly with the purification of lead and the recovery of silver therefrom.

The process, so far as concerns the purification of lead and the production of lead chloride for electrolytical decomposition into chlorine and refined lead, consists in forming pure lead nitrate as hereinafter mentioned, decomposing a soluble chloride with the lead nitrate, thus forming lead chloride and a nitrate, then decomposing the nitrate thus formed to produce nitric acid, oxidizing metallic lead (which has been freed from zinc), and dissolving the lead oxide in the nitric acid, recovering silver and forming pure nitrate of lead, with which to continue the operation, the base of the nitrate from which the nitric acid has been recovered being available for treating more raw material from which the soluble chloride to be treated is obtained. The soluble chloride to be thus treated may either be calcic or magnesic chloride, the former obtained from the waste chloride liquors of the ammonia-soda process and the latter obtained either from the same or from a native source. Assuming that calcic chloride (contained in the mixed calcic and sodic chloride liquors obtained in the ammonia-soda process by driving off the ammonia by means of lime in the usual way) is to be decomposed directly with lead nitrate, we proceed as follows—The mixed chloride liquors are to be first concentrated by boiling, until on cooling practically all the sodic chloride will crystallize out. To the calcic chloride thus obtained a sufficient quantity of lead nitrate in (preferably hot) solution is added, to cause complete double decomposition, whereby lead chloride is precipitated and nitrate of lime remains in solution. This nitrate of lime will contain some lead chloride in solution, which will not precipitate out on cooling, but by adding some of the base of the nitrate of lime solution in the form of, say, milk of lime, the chloride remaining in solution will precipitate out as oxychloride of lead. Or any other suitable base may be used, such as lead oxide (preferably lead hydrate) magnesia, or caustic soda, for example. The nitrate of lime after separation from the lead chloride, is to be evaporated to dryness and decomposed at a low red heat in any suitable apparatus, such as a decomposing pan or a muffle furnace, so as to drive off nitrous fumes which are to be caught, oxidized, and condensed into nitric acid in the usual way, say, by a Lunge plate power. Any nitrate or nitrite of lime that may remain undecomposed, may be washed out of the lime residue and added to the next batch of nitrate of lime to be evaporated and decomposed, so that practically all or nearly all the nitric acid is eventually recovered. This nitric acid is used over again for the production of more nitrate of lead (for decomposing more calcic chloride) by oxidizing metallic lead (which has been freed from zinc), and then dissolving the lead oxide in the nitric acid. All the silver (and other metallic impurities which remained in the metallic lead after the elimination of zinc) will, if in solution, precipitate out of the nitrate of lead solution on the addition thereto of spongy or finely divided lead, and this is accordingly to be done in order that the lead chloride formed from this nitrate as above described shall, on electrolytical decomposition as hereinafter described yield a pure metallic lead. If the chloride to be decomposed by lead nitrate be magnesic chloride, it may either be produced from the waste chloride liquors of the ammonia-soda process or from native sources. If the former, the calcic chloride (obtained by crystallizing out the sodic chloride from the mixed calcic and sodic chloride liquors of the ammonia-soda process) is converted into magnesic chloride by the Schaffner and Helbig process, which consists in mixing "soft burnt" or hydrated oxide of magnesium with the calcic chloride and "gasing" with carbonic acid whereby magnesic chloride is obtained in solution with a precipitate of calcic carbonate. This magnesic chloride after being separated from the precipitate, is to be treated with nitrate of lead (in exactly the same way as above described in regard to calcic chloride) for the production of lead chloride and nitrate of magnesia. The latter is to be decomposed with heat, and this decomposition is in some respects facilitated by first converting the nitrate of magnesia into an oxy-salt by the addition to it of "soft burnt" magnesia and in any case it yields nitric acid and magnesia, which being "soft burnt" may be hydrated by boiling in water and so rendered fit for use over again to form more magnesic chloride, while the nitric acid is available for forming more lead nitrate.

If the magnesic chloride treated be obtained from a native source, (Stassfurt salts or sea-water for example) this magnesic chloride is simply dissolved and decomposed by nitrate of lead, the remainder of the operations being the same as above described, except that "soft burnt" magnesia will be in this case obtained as a product.

The lead chloride produced as above described is to be collected, washed if necessary, and dried, and is then to be fused in a crucible or other suitable vessel, and submitted to electrolysis while in the fused condition in the manner hereinafter described with reference to the accompanying drawings, forming part of this specification, in which—

Figure 1 is a longitudinal vertical section of an electrolytic decomposition cell, and Fig. 2 is a diagrammatic view illustrating the cycle of operations.

$a$ is the anode and $c$ the cathode plates. This electrolytic decomposition cell may be a trough $t$, preferably of earthenware or enameled iron, and it may be heated in a sand bath or directly by gas or other means, whereby it may be maintained at a constant temperature. In this vessel or cell are to be placed a number of plates $a$, $c$, say of carbon, graphite or other suitable material unattackable by chlorine and unaffected by the fused chloride in which they are immersed, said plates being arranged like the plates of an ordinary galvanic battery and being so connected to the main conductors as to be alternately anodes and cathodes. Two or more such cells may be used grouped, by preference in series, the cathode plates of the one cell being coupled to the anode plates of the other cell, whereby a more economical production of chlorine may sometimes be obtained than by the use of a single cell. This trough is closed by a cover which may be sealed for instance by means of a liquid joint as shown at $j$, or by a washer of asbestos card, and provided with a pipe $p$ to convey away the chlorine. The electrodes are so supported in the trough that they do not touch one another or the metallic lead which collects in a molten state at the bottom of the trough, sufficient space being left for the said metallic lead (which results from the decomposition of the fused chloride) to flow beneath the plates without touching them and so short circuiting them. The bottom of the trough may slope toward one end where the molten metallic lead will collect and whence it may be caused to run off spontaneously by a siphon $s$ or other means. The plates may pass through slots in the cover of the trough with which they make gas-tight joints. They should not extend the full width of the trough, in order to allow the chlorine generated to flow past them to the chlorine outlet, and they should be provided with external binding clips by which they may be coupled respectively to the anode and cathode conductors. The overflow siphon is made of earthenware or of iron enameled externally, and the overflow of the molten lead is caused by the pressure of the fused lead chloride in the tank, the bend of the overflow pipe being at such a height that the level of the molten lead will remain constant, provided the fused chloride is kept at the same level. Suitable provision should therefore be made for supplying the chloride to the tank without removing the cover. This may be done by introducing the chloride through a pipe $i$ passing through the cover and sealed against the escape of chlorine by dipping into the molten chloride in the trough. The level of the chloride can thus be kept constant and the process rendered continuous. The cathode plates may, however, be omitted and the molten lead made the cathode, in which case sufficient lead for the purpose would be put into the trough at the outset, enough always being retained to form a cathode of extended area, the conductor connected with the negative terminal of the source of electricity being in that case made of iron tinned, to insure good electrical contact with the molten lead into which it is led. Whatever form of apparatus may be adopted, care should be taken that the areas of the exposed surfaces of the anode and cathode should respectively correspond.

Owing to the exceptionally low resistance of fused lead chloride, a large current of low voltage, say two or three volts or less, may be employed, the conductors and dynamo being similar to those used in electroplating.

To facilitate the comprehension of our process we will briefly recapitulate the cycle of operations with reference to the diagram Fig. 2. accompanying this specification. Commencing then at A, the soluble chloride (which for the sake of illustration is assumed to be calcic chloride) is here decomposed with purified lead nitrate, thus forming lead chloride and a nitrate; the lead chloride is submitted to electrolysis while in a fused condition at A' thereby yielding chlorine which goes to $A^2$ and pure lead which goes to $A^3$, while the nitrate (which in the example illustrated is nitrate of lime) passes to B where it is decomposed to produce nitrous fumes which pass to B', the base passing to C. At B' the nitrous fumes are converted into nitric acid and crude lead oxidized with all its impurities into oxide of lead is added from D. The impure lead nitrate thus formed passes to E where the silver and other impurities it contains are recovered, the purified lead nitrate thus obtained passing to A for another operation, thus completing the cycle. It will thus be seen that whereas fresh quantities of lead and of calcic chloride enter into operation at each cycle, the same nitric acid is used over and over again indefinitely. Thus silver is recovered as rich silver lead from impure lead, and pure lead is recovered at $A^3$ while the calcic chloride liquors are decomposed into chlorine and lime, as indicated at $A^2$ and C respectively.

We claim—

The herein described process of conjointly producing chlorine, purifying metallic lead, and recovering silver, based upon the decomposition of a soluble chloride such as herein specified) by nitrate of lead, the said process consisting in the following cycle of operations viz—decomposing the soluble chloride with pure lead nitrate to form lead chloride and a nitrate, then, on the one hand decomposing the lead chloride electrolytically while in a fused condition to produce chlorine and refined lead, and on the other hand decomposing the nitrate to obtain nitric acid, oxidizing metallic lead (which has been freed from zinc), dissolving lead oxide in the nitric acid, and precipitating silver from the nitrate of lead solution to form pure nitrate of lead, with which to continue the cycle of operations, all substantially as herein specified.

Dated this 21st day of March, 1893.

FARNHAM MAXWELL LYTE.
CECIL HENRY MAXWELL LYTE.

Witnesses:
ALICE MAXWELL LYTE,
*60 Finborough Road, London, S. W.*
G. F. WARREN,
*Notary Pulic, 17 Gracechurch Street, London.*